United States Patent
Tomford et al.

(10) Patent No.: US 7,290,788 B2
(45) Date of Patent: Nov. 6, 2007

(54) AIRBAG BRACKET

(75) Inventors: Glenn E. Tomford, Ypsilanti, MI (US);
David Busha, Chelsea, MI (US);
Donald Cvengros, Canton, MI (US);
D'Andre Sakhone, Royal Oak, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 380 days.

(21) Appl. No.: 10/655,175

(22) Filed: Sep. 3, 2003

(65) Prior Publication Data

US 2005/0046155 A1 Mar. 3, 2005

(51) Int. Cl.
*B60R 21/16* (2006.01)
(52) U.S. Cl. .................... 280/728.2; 280/732
(58) Field of Classification Search ............ 280/728.1, 280/728.2, 731, 732, 751, 752
See application file for complete search history.

(56) References Cited

U.S. PATENT DOCUMENTS

| | | | | |
|---|---|---|---|---|
| 5,096,223 A | * | 3/1992 | Tekelly et al. ............ | 280/748 |
| 5,127,669 A | * | 7/1992 | Suran et al. .............. | 280/732 |
| 5,135,252 A | * | 8/1992 | Suran et al. .............. | 280/732 |
| 5,425,549 A | | 6/1995 | Oda ......................... | 280/728.2 |
| 5,489,116 A | | 2/1996 | Boag ........................ | 280/728.2 |
| 5,511,819 A | | 4/1996 | Spilker et al. ............ | 280/728.2 |
| 5,533,747 A | * | 7/1996 | Rose ........................ | 280/728.2 |
| 5,700,028 A | | 12/1997 | Logan et al. ............. | 280/728.2 |
| 5,700,029 A | | 12/1997 | Enders ...................... | 280/728.2 |
| 5,979,929 A | | 11/1999 | Stanger et al. ............ | 280/728.2 |
| 6,173,988 B1 | | 1/2001 | Igawa ........................ | 280/728.2 |
| 6,176,511 B1 | * | 1/2001 | Adkisson et al. ......... | 280/728.2 |
| 6,196,588 B1 | * | 3/2001 | Sugawara ................... | 280/779 |
| 6,286,858 B1 | | 9/2001 | Shepherd et al. ......... | 280/728.2 |
| 6,296,277 B1 | * | 10/2001 | Bittinger et al. ........... | 280/748 |
| 6,299,198 B1 | | 10/2001 | Nakashima et al. ...... | 280/728.3 |
| 6,312,008 B1 | | 11/2001 | Neag ......................... | 280/728.2 |
| 6,523,878 B2 | | 2/2003 | Scheidel .................... | 296/70 |
| 6,951,348 B2 | * | 10/2005 | Enders ..................... | 280/728.2 |

FOREIGN PATENT DOCUMENTS

| | | |
|---|---|---|
| DE | 39 10 008 C2 | 2/1994 |
| DE | 44 39 576 A1 | 5/1996 |
| DE | 44 30 588 C2 | 2/1999 |
| DE | 202 07 537 U1 | 11/2002 |
| DE | 101 39 593 A1 | 2/2003 |
| DE | 203 10 345 | 10/2003 |

* cited by examiner

*Primary Examiner*—Paul N. Dickson
*Assistant Examiner*—Toan C. To
(74) *Attorney, Agent, or Firm*—Brinks Hofer Gilson & Lione

(57) ABSTRACT

A bracket is provided for connecting an airbag module to a structural member in an automotive vehicle. The bracket provides three degrees to freedom to allow the fit and finish of the interior panels to be determined without being affected by the rigid connection between the airbag module and the structural member. Holes are also provided in the bracket for tuning energy management.

20 Claims, 3 Drawing Sheets

AIRBAG BRACKET

BACKGROUND

The present invention relates generally to automotive vehicles, and particularly to an airbag connection system.

Those in the automotive arts are well-familiar with airbag systems that deploy an inflatable airbag when an automotive vehicle crashes in order to protect the occupants. Typically, an airbag system includes one or more airbag modules installed in areas that are most likely to come into contact with an occupant during a crash and thus possibly injure the occupant. For example, it is common practice to install airbag modules in or around the steering wheel, in front of the passenger seat, and along the sides of the doors. As those in the art well-know, an airbag module normally includes an airbag, an inflating system and an activation system. The details of how airbag modules are constructed are well-known and not particularly important to the invention described herein, thus further description at this point is unnecessary.

Since an airbag module is only used during a crash (i.e., the airbag deploys during a crash but remains in a wait state the rest of the time), it is desirable to install the airbag modules unobtrusively within or behind various interior panels in the vehicle (e.g., in the steering wheel, behind the instrument panel, and behind the door panels). In order to satisfy the aesthetic demands of vehicle users, it is important to ensure that the fit and finish of all of the panels in the vehicle line up and fit smoothly together. As those in the art generally know, it can be a difficult, time-consuming and costly effort to ensure an acceptable fit and finish for all of the interior panels, in part due to the sheer complexity of modern vehicle interiors.

Automotive vehicle manufacturers must also be concerned with energy management issues related to the airbag modules. For example, airbag modules typically experience two different types of events that require energy management. Those two events include impacts to the interior panels which are transferred to the airbag module in cases where the airbag module does not deploy and actual deployment of the airbag module during a major crash. These two events require considerably different energy management techniques, which in some respects involve contradictory issues.

During an impact to the airbag module in which the airbag module does not deploy, vehicle manufacturers must be concerned with ensuring that the impacted area absorbs energy. This concern relates to the expected event in which an occupant is thrown forward during a minor crash or an overly harsh application of the brakes. The occupant may then impact against the interior panel that covers the airbag module (usually with the occupant's head) which results in the impact energy being transferred to the airbag module. (The airbag module by its very essence is likely to be impacted during these types of situations since the airbag modules are located where serious impacts during crashes are expected to occur.) During these types of impacts, the airbag module should absorb sufficient energy to avoid major injury to the person impacting the airbag module. The government's Federal Motor Vehicle Safety Standard (FMVSS) 201 is addressed to this concern. For example, during sudden vehicle decelerations in which the airbag does not deploy, FMVSS 201 requires the deceleration of a head impact test form to be within a certain range for a given time interval.

On the other hand, during actual deployment of the airbag module in a major crash, vehicle manufacturers must be concerned with ensuring that energy is conserved for deployment of the airbag. Thus, during a major crash in which the airbag deploys, the airbag module should remain rigidly connected to the vehicle structure so that the full energy of the deploying airbag is used to force the airbag out towards the vehicle interior and to resist the forward movement of the occupant. Therefore, in this situation it is undesirable for the deploying energy to be dissipated, or absorbed, by the airbag module.

It is also desirable to avoid major damage to the structure of the vehicle, which often occurs as the result of significant impacts to the airbag module. Airbag modules typically must be connected to the structure of the vehicle to ensure that the airbag properly deploys during a crash and protects the occupants from high acceleration forward motion. However, because the airbag module is connected to the vehicle structure, it is common for the vehicle structure to be damaged along with the airbag module during an impact. This significantly increases the cost of repair, since the airbag module and the entire structure connected to the airbag module must often be replaced.

In addition to the issues discussed above, automotive vehicle manufacturers must also be concerned with the cost of vehicle parts and assembly. Manufacturers continuously strive to minimize the cost of providing automotive vehicles in order to make profits, compete successfully in the marketplace, and satisfy consumer demand for low cost, high performance vehicles. Thus, vehicle manufacturers are actively seeking solutions that minimize costs while providing better vehicle performance.

BRIEF SUMMARY

A bracket is provided to connect an airbag module to a structural member. The bracket includes a slot for attaching the airbag module to the bracket and a slot with an oversized width for attaching the bracket to the support member. Thus, the bracket provides three degrees of freedom. As a result, the fit and finish of the airbag assembly can be easily set while providing a rigid connection between the airbag module and the structural member. The bracket is also provided with slots that tune the rigidity of the bracket for energy management. The bracket further improves serviceability by minimizing damage to the structural member and providing easy replacement of the airbag assembly.

BRIEF DESCRIPTION OF SEVERAL VIEWS OF THE DRAWINGS

The invention, including its construction and method of operation, is illustrated diagrammatically in the drawings, in which.

DETAILED DESCRIPTION

Figure 1:
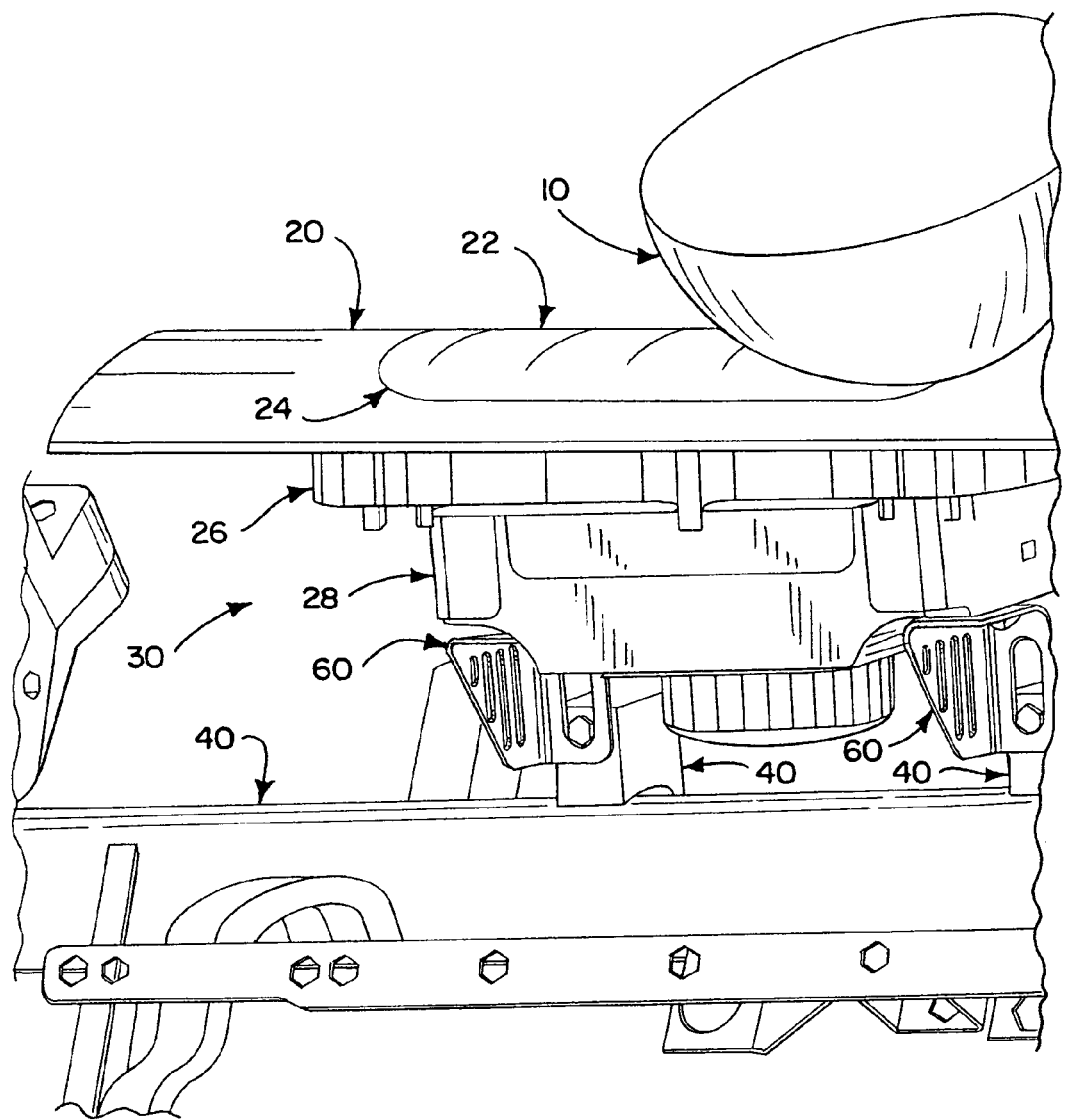
FIG. 1 is a three dimensional view of an airbag assembly connected to a cross beam.

Turning now to the drawings, and particularly to FIG. 1, the assembly of an airbag module 28 and a crossbeam 40, or structural member, are shown. In the particular embodiment described herein, the assembly is especially designed for use in a passenger airbag system, but the details described could be easily modified for use in other airbag systems.

The assembly includes an airbag panel 20 with an airbag door 22. The airbag panel 20 is typically made from plastic, and laser scoring is used to form a semi-circular breakable seam 24 around the airbag door 22. A hinge (not shown) is heat staked to the airbag panel 20 and the airbag door 22. Thus, when the airbag deploys, the force of the airbag will break the scored seam 24, and the airbag will burst through the opening formed by the seam 24. During deployment, the hinge serves to restrain the airbag door 22 and prevent the door 22 from flying dangerously through the interior of the vehicle.

An airbag ring 26 is also attached to the airbag panel 20 with vibration welding. The airbag ring 26 provides a series of fastening points 25, 27 (only some shown and identified) for attaching both the airbag module 28 and the instrument panel 50 to the airbag ring 26. Various fastening systems may be used to fasten the airbag ring 26 to the airbag module 28 and the instrument panel 50, including screws, studs and so forth. For clarity two separate figures show the attachment of the airbag ring 26, airbag module 28 and instrument panel 50. In FIG. 1, the airbag module 28 is shown attached to the airbag ring 26, and in FIG. 2 the instrument panel 50 is shown attached to the airbag ring 26.

The airbag module 28 includes conventional airbag components, such as an airbag, an inflating system and an activation system. The airbag module 28 is attached to two brackets 60 through a slot 64 in each of the brackets 60. Various fasteners may be used to attach the airbag module 28 to the bracket 60, such as screws, studs and so forth. The bracket 60 is attached on the other end to a cross beam 40 through another slot 68. Again, various fasteners may be used to attach the cross beam 40 and the bracket 60. The cross beam 40 is a structural member of the vehicle and typically extends across the length of the interior of the vehicle below the instrument panel 50.

Figure 3:
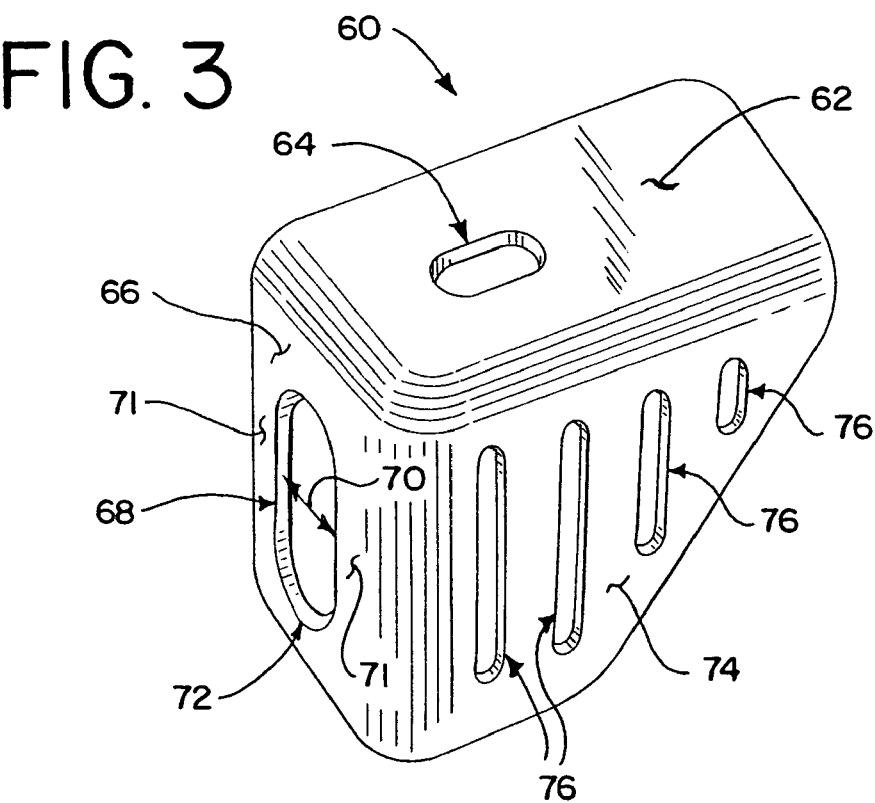
FIG. 3 is a three dimensional view of one perspective of a bracket.
Figure 4:
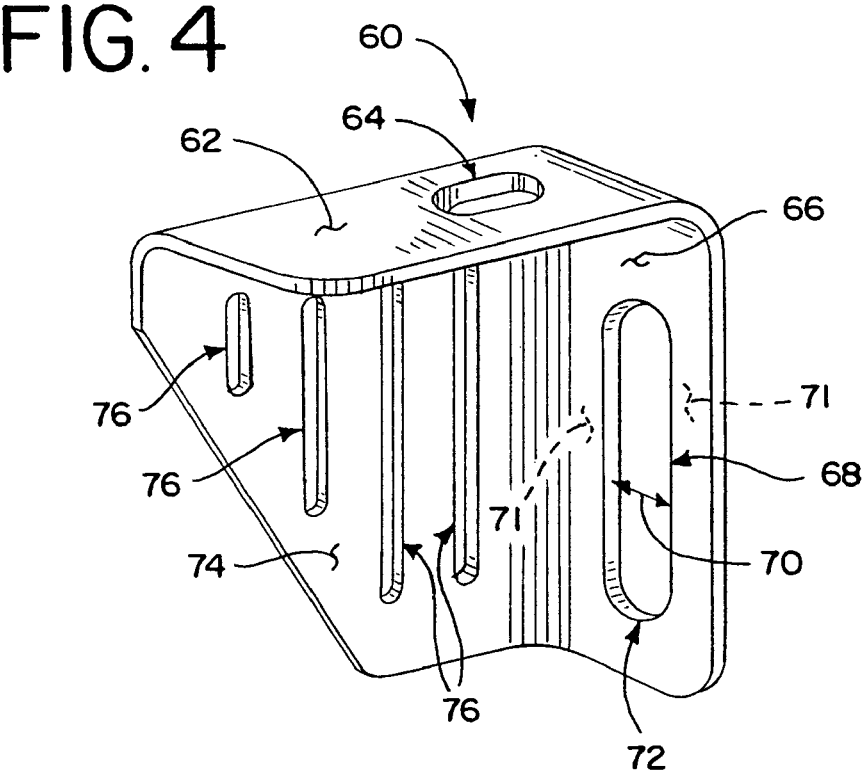
FIG. 4 is a three dimensional view of another perspective of the bracket.

Turning to FIGS. 3 and 4, the bracket 60 may be made from various materials. However, in the described embodiment, cold rolled steel that has been formed in a single press, progressive die is used. Thus, the bracket 60 is particularly inexpensive to make. In addition, both of the two brackets 60 are made identical to each other instead of being made symmetrical, thereby reducing the number of unique parts to one instead of two. The bracket 60 has three sides 62, 66, 74, or end portions. On the first side 62, an airbag module slot 64 is provided for attachment to the airbag module 28. On the second side 66, a cross beam slot 68 is provided for attachment to the cross beam 40. The cross beam slot 68 is provided with an oversized width 70 that is larger than the fastener used for attachment. For example, if a 6 mm fastener is used, the oversized width 70 of the slot 68 may be 11 mm, thus providing 2.5 mm of clearance on both sides of the fastener. On the third side 74, a series of slots 76 are provided for tuning the rigidity of the bracket 60. In the described embodiment, four parallel slots 76 are shown oriented perpendicular to the airbag module 28. However, other arrangements of holes may be used for the slots 76 as needed.

The bracket 60 provides a number of advantages over conventional assemblies for connecting airbag modules 28 to the structure of an automotive vehicle. Traditionally, airbag modules have been connected directly to the structural members of the vehicle. However, this alternative presents numerous problems relating to the fit and finish of the interior panels, energy management and serviceability.

One advantage provided by the bracket 60 is improved fit and finish of the interior panels. A review of the assembly process of the instrument panel 50 will make this advantage more apparent. In a typical assembly process, the airbag panel 20, hinge and airbag ring 26 are first assembled together. The airbag module 28 is then attached to the airbag ring 26, thus providing an airbag subassembly 30. Separately, the instrument panel 50 is attached to the cross beam 40, and subassembly of various components onto the instrument panel-cross beam assembly is performed. Next, the airbag subassembly 30 is installed into the instrument panel-cross beam assembly. The location of the airbag subassembly 30 is then precisely positioned within the instrument panel 50 to ensure an acceptable fit and finish between the airbag panel 20 and the instrument panel 50. Of course, the described sequence of assembly may be modified as needed depending on various manufacturing considerations. For example, the airbag subassembly 30 could be installed into the instrument panel 50 first. Then, the instrument panel-airbag assembly could be attached to the cross beam 40.

After the desired fit and finish is achieved between the airbag panel 20 and the instrument panel 50, the two brackets 60 are attached to the airbag module 28 and the cross beam 40 to provide a rigid connection between the airbag module 28 and the cross beam 40. Because the bracket 60 provides three directions of adjustment (i.e., three degrees of freedom), the brackets 60 can be rigidly attached to the airbag module 28 and the cross beam 40 without interfering or affecting the previously determined fit and finish between the airbag panel 20 and the instrument panel 50. One direction of adjustment that is provided is a fore-aft adjustment. This direction of adjustment is provided along the length of the airbag module slot 64. Another direction of adjustment that is provided is an up-down adjustment. This direction of adjustment is provided along the length of the cross beam slot 68. Still another direction of adjustment that is provided is a side-side adjustment. This direction of adjustment is provided across the oversized width 70 of the cross beam slot 68. Thus, it can now be seen that the bracket 60 provides advantages in maintaining the fit and finish of the interior panels while providing a rigid connection for the airbag module 28.

Another advantage of the bracket 60 is that the energy that occurs during impacts and deployment can be managed by tuning the rigidity of the bracket 60. During an impact to the airbag module 28, the brackets 60 may temporarily flex or permanently deform to absorb energy. In FIG. 1, a head form 10 that is representative of a person's head is shown impacting the airbag panel 20. The energy from this impact is transferred through the airbag module 28 to the brackets 60. The brackets 60 then absorb the impact energy through flexure or deformation. The slots 76 on the third side 74 of the bracket 60 are used to tune the desired rigidity of the bracket 60. Thus, in a particular vehicle application four slots 76 oriented perpendicular to the airbag module 28 as shown may provide the desired rigidity, but in another vehicle application a different arrangement of holes may be needed to achieve the desired rigidity. By adding the holes 76, or slots 76, to the bracket 60, the bracket 60 is able to absorb most of the impact energy without transferring a substantially amount of energy to the cross beam 40. In addition, the rigidity of the bracket 60 may be tuned by using different materials to make the bracket 60, such as different grades of steel. Accordingly, by tuning the rigidity of the bracket 60, damage to the cross beam 40 can be minimized.

In addition, energy is also absorbed through the slide plane 71 along the second side 66 of the bracket 60. The cross beam slot 68 is positioned on the second side 66 so that attachment of the slot 68 to the cross beam 40 occurs at the end 72 of the slot 68 away from the airbag module 28. Thus, when the airbag module 28 is impacted, the bracket 60 may slide along the cross beam slot 68 towards the cross beam 40, thereby absorbing additional energy.

During deployment of the airbag module 28, the bracket 60 conserves energy by maintaining a rigid connection between the airbag module 28 and the cross beam 40. The size, shape, arrangement and orientation of the slots 76 may be changed to achieve the desired rigidity. During deployment of the airbag, a rigid bracket 60 is preferred to conserve energy. On the other hand, during impacts to the airbag module 28, a softer bracket 60 is preferred to absorb energy. Thus, these competing events require a balancing between contradictory needs. The slots 76 solve this problem by allowing the bracket 60 to be easily tuned to a particular vehicle application to achieve a balance between the need for a soft bracket 68 and the need for a rigid bracket 60.

Another advantage of the bracket 60 is that it improves serviceability of the airbag system after an impact to the airbag module 28 or a deployment of the airbag module 28. Traditionally, the airbag module 28 was connected directly to a structural member to provide a rigid connection for the airbag module 28. However, in this traditional design the full amount of energy from impact or deployment was transferred to the structural member. As a result, the structural member could be damaged and required replacement. The need to replace the structural member in addition to the airbag assembly 30 significantly raises the cost of repairing damage after an impact or deployment. This is due to the expense of the structural member, but also due to the fact that the entire instrument panel 50 is usually attached to the structural member, thereby necessitating the need to also replace the entire instrument panel 50. Additional labor is also required to replace all of these parts.

Figure 2:
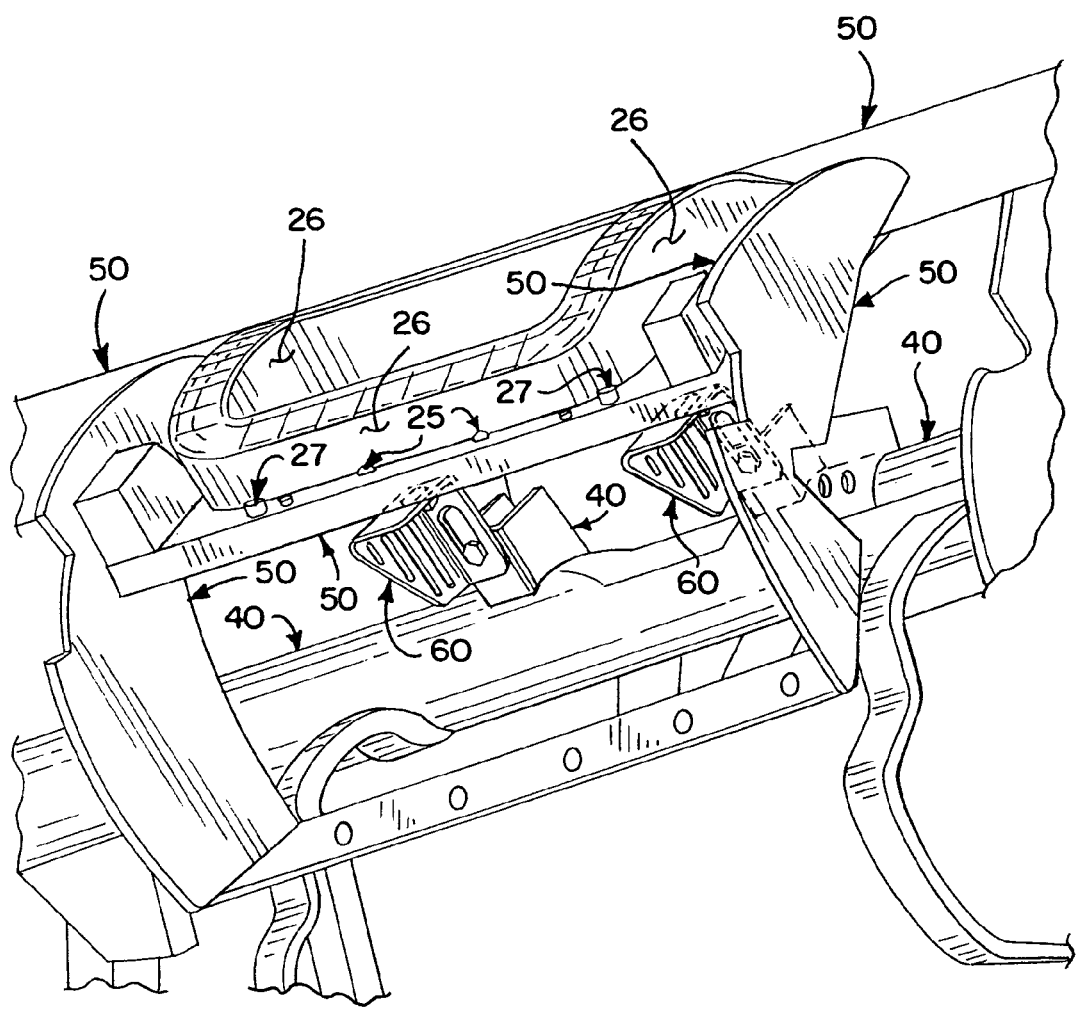
FIG. 2 is a three dimensional view of an airbag ring installed in an instrument panel.

The bracket 60 minimizes and simplifies repair costs by isolating the expected damage to the bracket 60. Thus, only a small amount of the impact or deployment energy is transferred to the cross beam 40. As a result, damage to the cross beam 40 is minimized. Because the cross beam 40 will typically remain undamaged, only the airbag assembly 30 will require replacement in addition to the brackets 60 (along with any other parts that are typically damaged during impacts or deployments). This greatly reduces the cost of repair. In addition, repair is simplified because the replacement airbag assembly 30 and the brackets 60 can be easily installed without having to remove the instrument panel 50 and the cross beam 40. For example, as shown in FIG. 2, the brackets 60 can be easily accessed from underneath the instrument panel 50 by removing the glove box. Thus, serviceability of the airbag system is also greatly improved.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

We claim:

1. A bracket for connecting an airbag module to a structural member of an automotive vehicle, comprising:
   a first end portion attaching said bracket to said airbag module;
   a second end portion attaching said bracket to said structural member; and
   a third end portion disposed between said first end portion and said second end portion, at least one hole tuning the rigidity of said bracket to a desired rigidity, said desired rigidity promoting deformation of said bracket during impacts to said airbag module thereby absorbing impact energy and minimizing damage to said structural member and said desired rigidity inhibiting deformation during deployment of said airbag module thereby conserving deployment energy;
   wherein said at least one hole is formed in said third end portion separate from said first end portion and said second end portion.

2. The bracket according to claim 1, wherein said at least one hole comprises a plurality of holes.

3. The bracket according to claim 1, wherein said at least one hole comprises at least one slot oriented perpendicular to said airbag module.

4. The bracket according to claim 3, wherein said at least one slot comprises a plurality of slots oriented parallel to each other.

5. A bracket for connecting an airbag module to a structural member of an automotive vehicle, comprising:
   a first end portion attaching said bracket to said airbag module;
   a second end portion attaching said bracket to said structural member; and
   at least one hole tuning the rigidity of said bracket to a desired rigidity, said desired rigidity promoting deformation of said bracket during impacts to said airbag module thereby absorbing impact energy and minimizing damage to said structural member end said desired rigidity inhibiting deformation during deployment of said airbag module thereby conserving deployment energy;
   wherein said at least one hole is separate from said first end portion and said second end portion;
   wherein one of said first end portion and said second end portion comprises a slot and a slide plane, said slot being elongated between two slot ends, wherein said two slot ends are oriented in a perpendicular direction to said airbag module and said slide plane is oriented parallel to said two slot ends, said slot being attached adjacent the slot end disposed away from said airbag module, said slot and said slide plane thereby being slidable during impacts to said airbag module thereby further absorbing impact energy and minimizing damage to said structural member.

6. The bracket according to claim 5, wherein said slot is disposed on said second end portion.

7. The bracket according to claim 5, wherein said at least one hole comprises at least one tuning slot oriented perpendicular to said airbag module.

8. The bracket according to claim 7, wherein said at least one tuning slot is disposed on a third end portion, said third end portion being oriented perpendicular to said second end portion.

9. The bracket according to claim 8, wherein said at least one tuning slot comprises a plurality of said slots oriented parallel to each other.

10. A bracket for connecting an airbag module to a structural member of an automotive vehicle, comprising:
    a first end portion attaching said bracket to said airbag module;
    a second end portion attaching said bracket to said structural member;

at least one hole tuning the rigidity of said bracket to a desired rigidity, said desired rigidity promoting deformation of said bracket during impacts to said airbag module thereby absorbing impact energy and minimizing damage to said structural member and said desired rigidity inhibiting deformation during deployment of said airbag module thereby conserving deployment energy, wherein said at least one hole is separate from said first end portion and said second end portion;

a center portion disposed between said first end portion and said second end portion, said first end portion and said second end portion and said center portion being rigid;

wherein one of said first end portion and said second end portion is adjustable in two directions and one of said first end portion and said second end portion is adjustable in one direction, attachment of said bracket to said airbag module and said structural member thereby being adjustable with three degrees of freedom; and whereby a fit between said airbag module and an instrument panel is maintained after said bracket is attached to said airbag module and said structural member and a rigid connection is formed between said airbag module and said structural member.

11. The bracket according to claim 10, wherein said first end portion and said second end portion are oriented perpendicular to each other, and wherein attachment of one of said first end portion and said second end portion comprises a first slot and attachment of one of said first end portion and said second end portion comprises a second slot with an oversized width, said first slot providing one adjustable direction along a length of said first slot and said second slot providing one adjustable direction along a length of said second slot and a second adjustable direction across said oversized width.

12. The bracket to claim 11, wherein said at least one hole is disposed on a third end portion, said third end portion being oriented perpendicular to said second end portion.

13. The bracket according to claim 12, wherein said at least one hole comprises a plurality of slots oriented perpendicular to said airbag module and parallel to each other.

14. A bracket for connecting an airbag module to a structural member of an automotive vehicle, comprising:

a first end portion attaching said bracket to said airbag module;

a second end portion attaching said bracket to said structural member; and at least one hole tuning the rigidity of said bracket to a desired rigidity, said desired rigidity promoting deformation of said bracket during impacts to said airbag module thereby absorbing impact energy and minimizing damage to said structural member and said desired rigidity inhibiting deformation during deployment of said airbag module thereby conserving deployment energy;

wherein said first end portion comprises a slot, wherein said second end portion comprises a slot, said second end portion being oriented perpendicular to said first end portion, wherein said at least one hole is separate from said first end portion and said second end portion;

wherein said at least one hole is disposed on a third end portion, said third end portion being oriented perpendicular to said second end portion, wherein said bracket is formed from a single piece of metal.

15. An assembly for connecting an airbag module to a structural member of an automotive vehicle, comprising:

an airbag module;

a structural member;

a bracket comprising two end portions and a center portion disposed between said two end portions, said two end portions and said center portion being rigid, one of said end portions attaching said bracket to said airbag module thereby forming one attachment and one of said end portions attaching said bracket to said structural member thereby forming another attachment;

wherein one of said end portions is adjustable in two directions and one of said end portions is adjustable in one direction, said attachments of said bracket to said airbag module and said structural member thereby being adjustable with three degrees of freedom;

whereby a fit between said airbag module and an instrument panel is maintained after said bracket is attached to said airbag module and said structural member and a rigid connection Is formed between said airbag module and said structural member.

16. The assembly according to claim 15, wherein said two end portions are oriented perpendicular to each other, and wherein one of said attachments comprises a first slot and one of said attachments comprises a second slot with an oversized width, said first slot providing one adjustable direction along a length of said first slot and said second slot providing one adjustable direction along a length of said second slot and a second adjustable direction across said oversized width.

17. The assembly according to claim 16, wherein said first slot is disposed on one of said end portions of said bracket and said second slot is disposed on the other said end portion.

18. The assembly according to claim 15, further comprising at least one hole tuning the rigidity of said bracket to a desired rigidity, said desired rigidity promoting deformation of said bracket during impacts to said airbag module thereby absorbing impact energy and minimizing damage to said structural member and said desired rigidity inhibiting deformation during deployment of said airbag module thereby conserving deployment energy, wherein said at least one hole is separate from said two end portions.

19. The assembly according to claim 18, wherein said at least one hole comprises a plurality of holes oriented parallel to each other.

20. The assembly according to claim 15, wherein said bracket is made from a predetermined grade of steel thereby tuning the rigidity of said bracket to a desired rigidity, said desired rigidity promoting deformation of said bracket during impacts to said airbag module thereby absorbing impact energy and minimizing damage to said structural member and said desired rigidity inhibiting deformation during deployment of said airbag module thereby conserving deployment energy.

* * * * *

UNITED STATES PATENT AND TRADEMARK OFFICE
CERTIFICATE OF CORRECTION

| | |
|---|---|
| PATENT NO. | : 7,290,788 B2 |
| APPLICATION NO. | : 10/655175 |
| DATED | : November 6, 2007 |
| INVENTOR(S) | : Glenn E. Tomford et al. |

It is certified that error appears in the above-identified patent and that said Letters Patent is hereby corrected as shown below:

<u>On the Title Page</u>

In column 1, item (75), delete "D'Andre Sakhone" and substitute --Sakhone D'Andre-- in its place.

<u>In the Claims</u>

Column 8, in claim 15, line 20, after "rigid connection" delete "Is" and substitute --is-- in its place.

Signed and Sealed this

Twenty Second Day of April, 2008

JON W. DUDAS
*Director of the United States Patent and Trademark Office*